US012596651B2

(12) United States Patent
     Rider

(10) Patent No.:     US 12,596,651 B2
(45) Date of Patent:          Apr. 7, 2026

(54) USER CONTROLLED ALLOCATION OF A SPECIFIC CACHE LINE AT TIME OF ACCESS

(71) Applicant: International Business Machines Corporation, Armonk, NY (US)

(72) Inventor: Scot Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/472,936

(22) Filed: Sep. 22, 2023

(65) Prior Publication Data

US 2025/0103507 A1      Mar. 27, 2025

(51) Int. Cl.
     *G06F 12/0897*          (2016.01)
     *G06F 12/128*           (2016.01)

(52) U.S. Cl.
     CPC ........ *G06F 12/0897* (2013.01); *G06F 12/128* (2013.01)

(58) Field of Classification Search
     CPC ........................... G06F 12/0897; G06F 12/128
     USPC ......................................................... 711/122
     See application file for complete search history.

(56) References Cited

U.S. PATENT DOCUMENTS

| | | | | |
|---|---|---|---|---|
| 6,460,114 | B1 * | 10/2002 | Jeddeloh ............... | G06F 12/084 |
| | | | | 711/120 |
| 7,689,508 | B2 * | 3/2010 | Davis ................. | G06Q 20/1085 |
| | | | | 455/406 |
| 2009/0132768 | A1 | 5/2009 | Jones et al. | |

| | | | | |
|---|---|---|---|---|
| 2011/0072213 | A1 * | 3/2011 | Nickolls ............. | G06F 9/30043 |
| | | | | 711/E12.024 |
| 2012/0059995 | A1 * | 3/2012 | Speier .................. | G06F 12/128 |
| | | | | 711/E12.024 |
| 2014/0122810 | A1 | 5/2014 | Bhoria et al. | |
| 2015/0026411 | A1 | 1/2015 | Lippert et al. | |
| 2016/0070651 | A1 * | 3/2016 | Shwartsman ....... | G06F 12/0862 |
| | | | | 711/122 |
| 2019/0266091 | A1 | 8/2019 | Robinson et al. | |
| 2023/0325314 | A1 * | 10/2023 | Chachad ............. | G06F 12/0828 |
| | | | | 711/154 |
| 2025/0103494 | A1 | 3/2025 | Rider | |

FOREIGN PATENT DOCUMENTS

| | | | | |
|---|---|---|---|---|
| CN | 111263934 | A * | 6/2020 | .......... G06F 12/0811 |

OTHER PUBLICATIONS

"List of IBM Patents or Patent Applications Treated As Related," for U.S. Appl. No. 18/472,936 as filed on Sep. 22, 2023.

* cited by examiner

*Primary Examiner* — Pierre Vital
(74) *Attorney, Agent, or Firm* — Patterson + Sheridan, LLP

(57)                ABSTRACT

Systems and techniques for controlling allocation of a cache line when performing a memory access request are described. An example technique includes receiving a memory access request from a user interface. The memory access request includes an indication of whether a cache line associated with the memory access request is to be allocated into a lower level cache within a computing system. The cache line is written into a line buffer within a line engine in the computing system in response to receiving the memory access request. The cache line is moved from the line buffer to an upper level cache in the computing system, without involving the lower level cache, when the memory access request indicates the cache line is not to be allocated into the lower level cache.

20 Claims, 7 Drawing Sheets

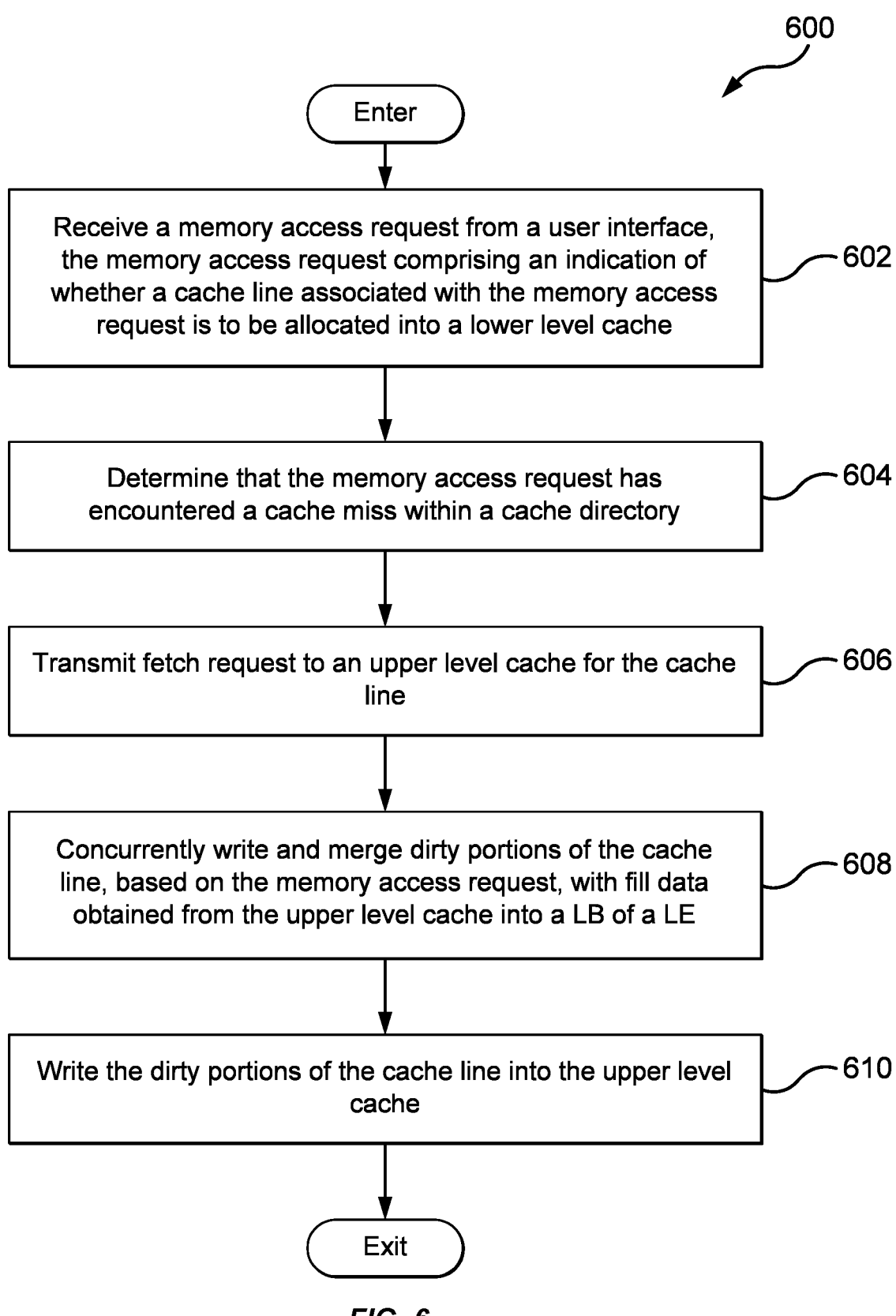

600

Enter

Receive a memory access request from a user interface, the memory access request comprising an indication of whether a cache line associated with the memory access request is to be allocated into a lower level cache — 602

Determine that the memory access request has encountered a cache miss within a cache directory — 604

Transmit fetch request to an upper level cache for the cache line — 606

Concurrently write and merge dirty portions of the cache line, based on the memory access request, with fill data obtained from the upper level cache into a LB of a LE — 608

Write the dirty portions of the cache line into the upper level cache — 610

Exit

*FIG. 6*

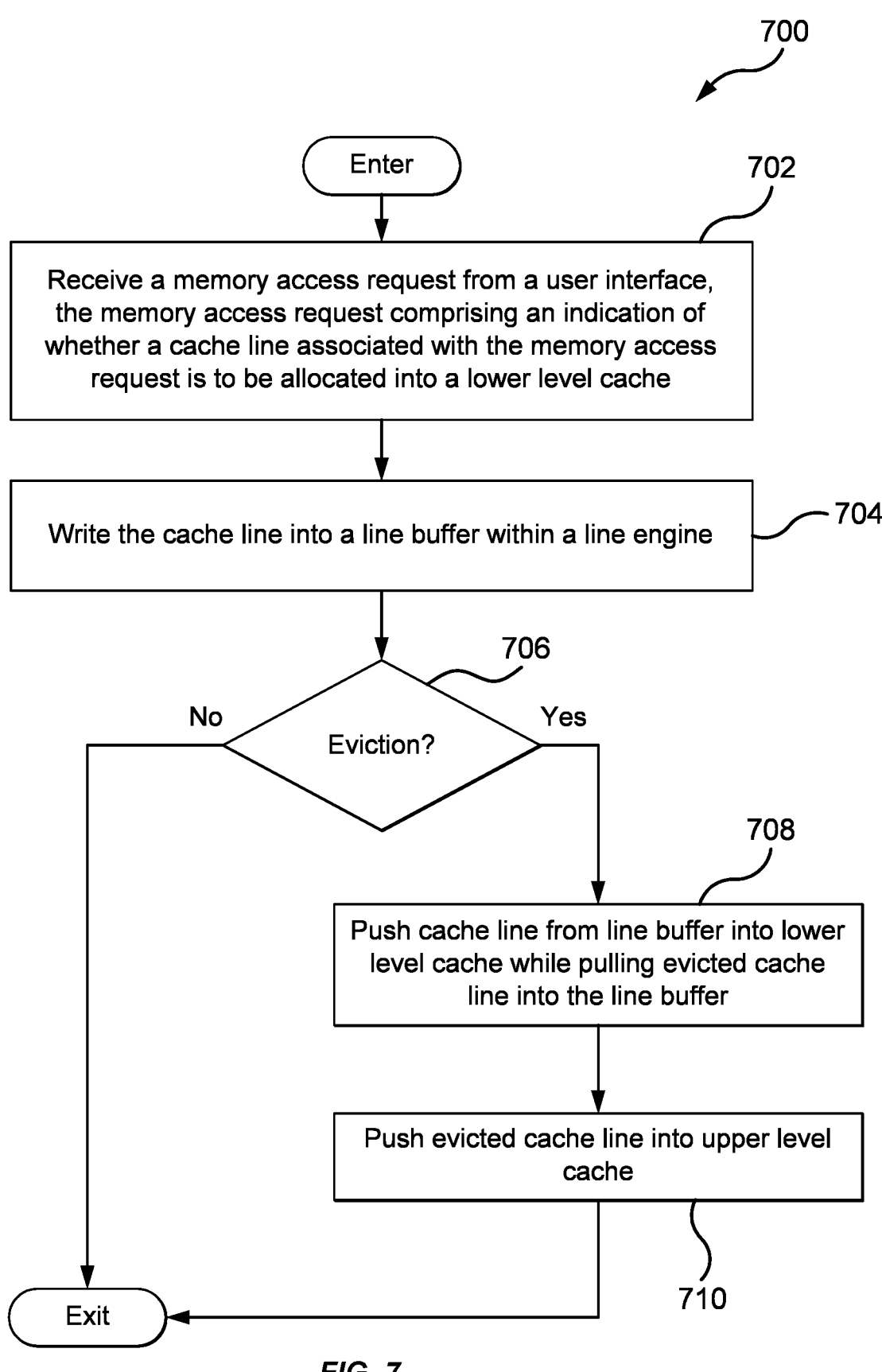

700

Enter

702

Receive a memory access request from a user interface, the memory access request comprising an indication of whether a cache line associated with the memory access request is to be allocated into a lower level cache

704

Write the cache line into a line buffer within a line engine

706

No ← Eviction? → Yes

708

Push cache line from line buffer into lower level cache while pulling evicted cache line into the line buffer Push evicted cache line into upper level cache

710

Exit

*FIG. 7*

USER CONTROLLED ALLOCATION OF A SPECIFIC CACHE LINE AT TIME OF ACCESS

BACKGROUND

The present invention relates to data processing systems, and more specifically, to systems and techniques for controlling allocation of a cache line when performing a memory access request.

Data processing systems may include multiple, sometimes relatively large amount of, physical hardware (e.g., processors, memory, storage, I/O, and combinations thereof) to perform different types of workloads (e.g., batch processing, transaction processing, etc.). For example, large data processing systems, such as mainframe computers, may include multiple clusters of processors (e.g., central processing units (CPUs)), memory, and other hardware, where one or more processors in each cluster may have different access pathways to the memory.

In such a multi-hardware data processing environment, the processors may communicate with each other using shared memory. Shared memory systems usually contain a hierarchy of caches (e.g., a hierarchy of memory stores based on varying access speeds) where the lowest cache levels are private to each individual processor and the last level cache is shared among all the processors. For example, frequently used data may be stored in cache memory (e.g., Level 1 (L1) cache) that is closest to functional units within a processor, so that the data is reachable with relatively high bandwidth (e.g., speed) and low latency (e.g., delay). On the other hand, less frequency used data may be stored in more distant locations (e.g., Level 2 (L2) cache, Level 3 (L3) cache), all the way out to main memory.

SUMMARY

One embodiment described herein is a computer-implemented method. The computer-implemented method includes receiving a memory access request from a user interface. The memory access request includes an indication of whether a cache line associated with the memory access request is to be allocated into a lower level cache within a computing system. The computer-implemented method also includes writing the cache line into a line buffer within a line engine in the computing system in response to receiving the memory access request. The computer-implemented method also includes moving the cache line from the line buffer to an upper level cache in the computing system, without involving the lower level cache, when the memory access request indicates the cache line is not to be allocated into the lower level cache.

Another embodiment described herein is a system. The system includes a plurality of line engines, a lower level cache, and an upper level cache. Each line engine includes a respective line buffer. At least a first line engine of the plurality of line engines includes logic configured to perform an operation. The operation includes receiving a memory access request from a user interface. The memory access request includes an indication of whether a cache line associated with the memory access request is to be allocated into the lower level cache. The operation also includes writing the cache line into the line buffer within the first line engine in response to receiving the memory access request. The operation further includes moving the cache line from the line buffer to the upper level cache, without involving the lower level cache, when the memory access request indicates the cache line is not to be allocated into the lower level cache.

Another embodiment described herein is a computer-readable storage medium. The computer-readable storage medium has computer-readable program code embodied therewith. The computer-readable program code is executable by one or more computer processors to perform an operation. The operation includes receiving a memory access request from a user interface. The memory access request includes an indication of whether a cache line associated with the memory access request is to be allocated into a lower level cache within a computing system. The operation also includes writing the cache line into a line buffer within a line engine in the computing system in response to receiving the memory access request. The operation further includes moving the cache line from the line buffer to an upper level cache in the computing system, without involving the lower level cache, when the memory access request indicates the cache line is not to be allocated into the lower level cache.

BRIEF DESCRIPTION OF THE DRAWINGS

FIG. 6 is a flowchart of an example method for performing a concurrent fill and byte merge operation of a cache line within a line buffer, according to one embodiment.

FIG. 7 is a flowchart of an example method for performing a concurrent eviction operation of a cache line within a line buffer, according to one embodiment.

DETAILED DESCRIPTION

Figure 1:
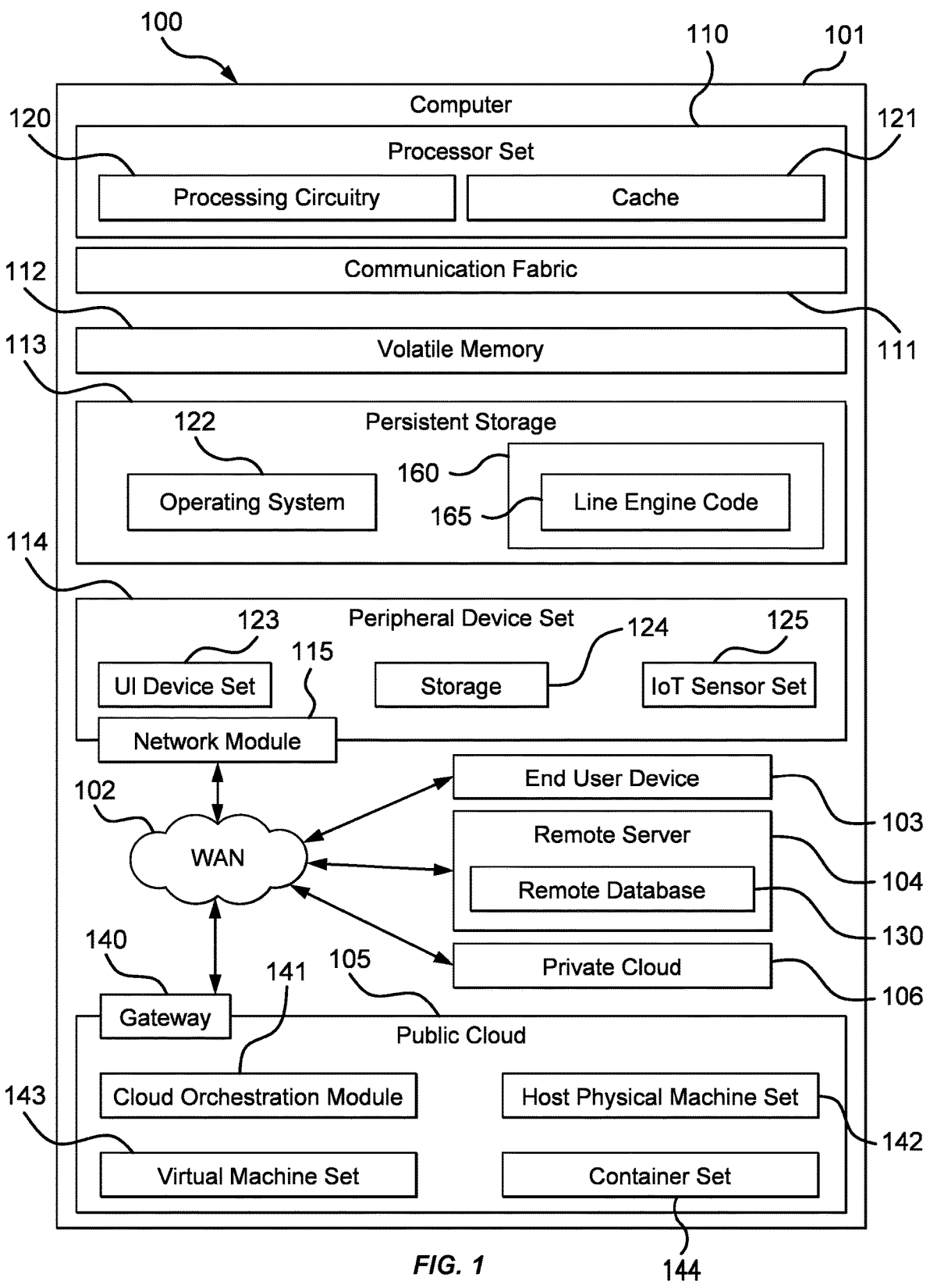
FIG. 1 is a block diagram of a computing environment, according to one embodiment.

Data processing system operators (e.g., network managers) may wish to perform certain operations without involving one or more of the caches in the data processing system. For example, in certain instances, a data processing system operator may send one or more messages to a host and may not want the message(s) to be allocated to the lowest level cache(s) (e.g., L1 cache(s)) within the data processing system, since the message(s) may displace data that the operator would like to keep cached within the lowest level cache. However, in conventional data processing systems that have a hierarchy of caches, a user may not have control over whether data associated with an access request (e.g., write request or read/fetch request) is stored within a lowest level cache (e.g., L1 cache) within the data processing system.

For example, in conventional data processing systems, when a user makes an access request via a user interface (UI), the data associated with the access request has to be written into the lowest level cache. For instance, when there is a cache hit (e.g., the lowest level cache has an available compartment), then the data is automatically written into the lowest level cache, since there may not be another place to store the data. As noted above, however, it may not be desirable to write every access request into the lowest level cache, since doing so may displace other frequently-used data within the cache, impacting the performance of the data processing system (e.g., increased latency).

Furthermore, another issue associated with always writing access requests into a lowest level cache is that, in certain instances, the user may be temporarily prevented from performing certain operations when the access request has a cache miss. For example, when a user makes an access request via the UI, the UI may stall (preventing the user from making another access request) while a determination is made as to whether the lowest level cache has an available compartment to store the data associated with the access request. If there is a cache miss (e.g., the lowest level cache does not have any available compartments), then the UI may continue stalling while an existing compartment is evicted to make room within the lowest level cache for storing the data associated with the access request. In some cases, conventional data processing systems may employ an eviction buffer to allow the new transfer to complete while the old data is being stored to an upper level cache (e.g., L2/L3 cache). Similarly, in situations where the incoming data has to be retrieved from an upper level cache (e.g., L2/L3 cache), the access request may be put in a hold state until the response is written into the lowest level cache prior to updating the data. Stalling the user, however, can negatively impact the performance of the data processing system (e.g., increased latency) as well as impact the user experience.

To address this, certain embodiments described herein provide systems and techniques for performing a user-controlled allocation of a specific cache line at the time of a memory access request, such as a read request, write request, or a combination thereof. That is, embodiments herein allow a user to control, via a UI and at the time of submitting an access request, whether a cache line associated with the access request is to be allocated within a lowest level cache or not allocated within the lowest level cache.

More specifically, in certain embodiments described herein, a data processing system is configured with one or more line engines (LEs) (also referred to as cache line engines) to handle access requests to one or more caches in the data processing system. Such caches may include any level cache within a hierarchy of caches, such as L1 caches, L2 caches, and L3 caches, as illustrative, non-limiting examples. Additionally, in certain embodiments, each LE is configured with a respective line buffer (LB) (also referred to as a cache line buffer) to hold incoming data associated with an access request. By configuring each LE with a respective LB, embodiments herein may enable a user to control, via a UI, whether the cache line associated with the access request is to be allocated within a lowest level cache (e.g., L1 cache) or not allocated within the lowest level cache. For example, as described herein, once an access request with a "no allocation" indication is sent, the LB within a given LE can be used to immediately hold the incoming data without allocating that data into the lowest level cache and without initially performing an eviction of the lowest level cache.

Note, to clearly point out novel features of the present invention, the following discussion omits or only briefly describes conventional features of data processing systems which are apparent to those skilled in the art. It is assumed that those skilled in the art are familiar with the general architecture of processors, and in particular with processors which operate in an in-order dispatch, out-of-order execution, or in-order completion fashion. It may be noted that a numbered element is numbered according to the figure in which the element is introduced, and is referred to by that number throughout succeeding figures. Additionally, as used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 160, which includes line engine code 165 configured to control allocation of a cache line into one or more caches at a time of a memory access request. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 160 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
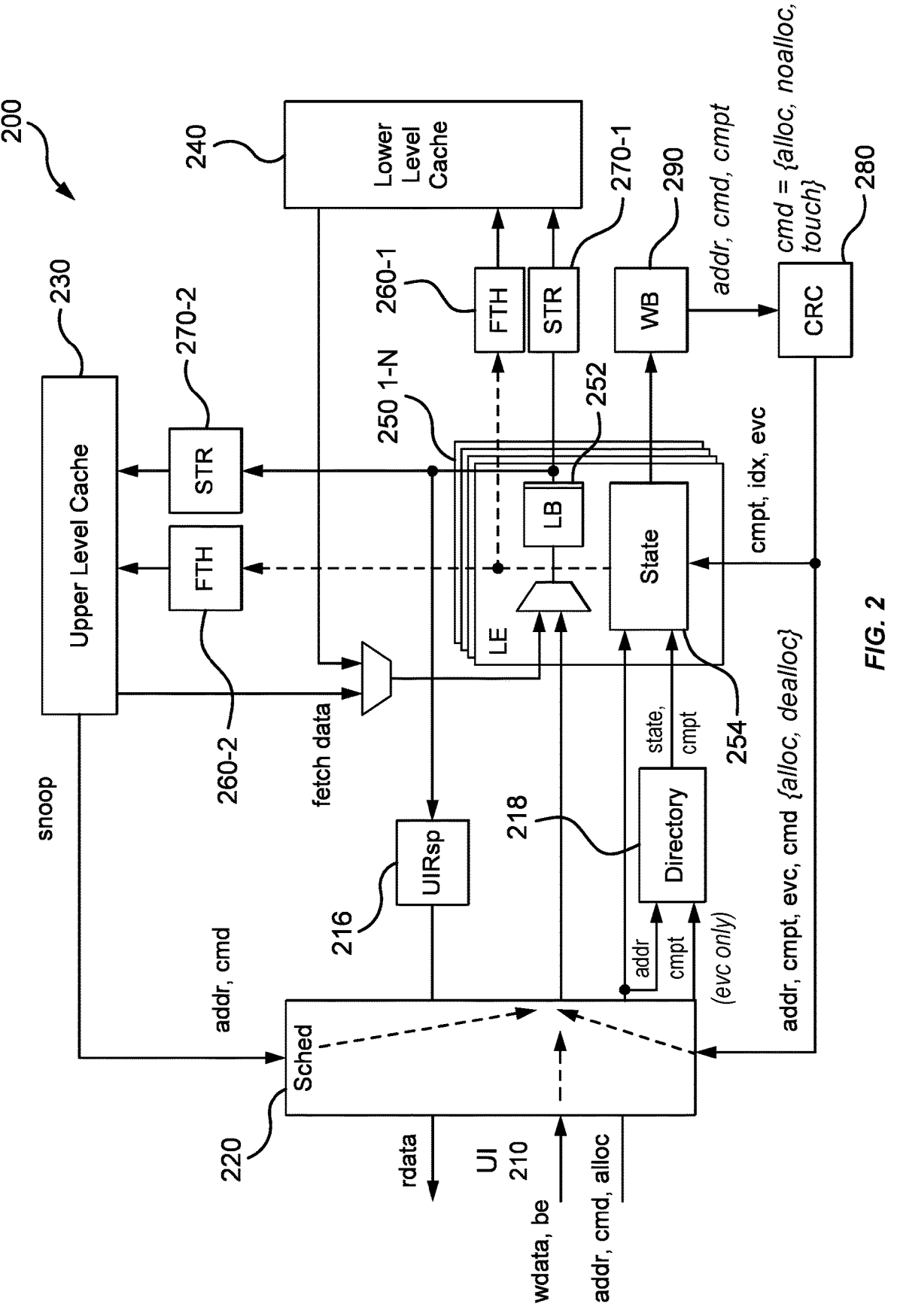
FIG. 2 illustrates an example system architecture, according to one embodiment.

FIG. 2 illustrates an example system architecture 200, according to one embodiment. In certain embodiments, the system architecture 200 is implemented within the computing environment 100 depicted in FIG. 1. The system architecture 200 includes, without limitation, a UI 210, a directory 218, a scheduler 220, an upper level cache 230, a lower level cache 240, one or more LEs 250 1-N, one or more fetch controllers 260 1-2, one or more store controllers 270 1-2, a cache replacement controller (CRC) 280, and a write back (WB) controller 290. In certain embodiments, one or more of the fetch controllers 260, store controllers 270, CRC 280, and WB controller 290 may be implemented as part of a memory controller (not shown). The upper level cache 230 is generally representative of a L2 cache or L3 cache. The lower level cache 240 is generally representative of a L1 cache. The directory 218 may determine a state of a previously accessed cache line according to a cache coherency protocol, such as MEI, MESI, and MOESI, as illustrative, non-limiting examples. In certain embodiments, the CRC 280 may implement a cache replacement policy, such as least recently used (LRU), as an illustrative, non-limiting example.

In the system architecture 200, the UI 210 may provide read and write control by allowing a user to send different types of access requests, such as read/fetch requests and write requests, as illustrative, non-limiting examples. In addition to providing read and write control, the UI 210 may include a directive "Allocate" that allows a user to indicate as part of the access request whether the cache line associated with the access request should be allocated in the lower level cache 240 or not allocated in the lower level cache 240. For example, the user may set Allocate=YES when the user wants to allocate a cache line to the lower level cache 240. In another example, the user may set Allocate=NO when the user does not want to allocate a cache line to the lower level cache 240. In this manner, the "Allocate" directive may allow for infrequently used data to be moved to upper coherent memory without modifying the state of the directory of the local cache.

As shown in FIG. 2, each LE 250 includes, without limitation, a respective LB 252 and a state engine 254. The state engine 254 is generally configured to control the state of each cache line. The LB 252 is configured to store an incoming cache line (e.g., data) associated with an access request. In particular, when a user makes an access request via the UI 210, the scheduler 220 may identify an available LE 250 for storing the incoming cache line and the directory 218 may determine the state of the cache line indicated in the access request as the address of the cache line is passed from the UI 210 to the LE 250.

For example, if the user sends "Allocate=YES" and the state is determined to be valid (e.g., the cache line indicated the access request is in the lower level cache 240), then the cache line indicated in the access request may be retrieved from the lower level cache 240 into the LB 252. In this example, the cache line in the LB 252 may be modified and written back to the lower level cache 240 when the access request is a write request. Alternatively, the cache line in the LB 252 may be returned to the UI (e.g., UI Response (UIRsp) 216) when the access request is a read request. If the state changes (e.g., from shared to exclusive), then the directory 218 may be updated to reflect the new state.

In another example, if the user sends "Allocate=YES" and the state is determined to be invalid (e.g., the cache line indicated in the access request is not in the lower level cache 240), then the cache line may be retrieved from the upper level cache 230 and allocated into the LB 252. In this example, the cache line in the LB 252 may be modified and written back to the lower level cache 240 when the access request is a write request. Alternatively, the cache line in the LB 252 may be returned to the UI (e.g., UI Response (UIRsp) 216) when the access request is a read request. In both cases, since the cache line was invalid in the lower level cache 240, the directory 218 and CRC 280 (e.g., LRU) are updated to reflect the new state, and the data is written into the lower level cache 240. The data written into the lower level cache 240 may be based on data obtained from the upper level cache 230 merged with the dirty updated bytes from the UI (e.g., via a concurrent fill and byte merge operation described in greater detail herein with respect to FIG. 3).

In yet another example, if the user sends "Allocate=NO" and the state is determined to be valid (e.g., the cache line indicated in the access request is in the lower level cache 240), then the cache line may be retrieved from the lower level cache 240 into the LB 252. In this example, the cache line in the LB 252 may be modified when the access request is a write request or returned to the UI (e.g., UIRsp 216) when the access request is a read request. The cache line may then be invalidated from the lower level cache 240 and CRC 280. If the cache line is dirty, then the cache line is written back to the upper level cache 230.

In yet another example, if the user sends "Allocate=NO" and the state is determined to be invalid (e.g., the cache line indicated in the access request is not in the lower level cache 240), then the cache line may be retrieved from the lower level cache 240 into the LB 252. In this example, when the access request is a read request, the cache line may be returned to the UI (e.g., UIRsp 216) and then discarded. Alternatively, when the access request is a write request, the cache line in the LB 252 may be modified, written to the upper level cache 230, and then discarded from the LE 250. In this situation, the directory 218 and CRC 280 may not be modified.

Advantageously, by allowing a user to indicate "Allocate=NO" (or "no allocate") in the access request, the scheduler 220 can write the incoming cache line into the LB 252 without having to store the cache line into the lower level cache 240 and without having to initially evict any data within the lower level cache 240.

In certain embodiments, when the user sends an access request that has a cache miss (e.g., the state is determined to be invalid), the LE 250 can immediately send a fetch request for the cache line to the upper level cache 230 while the incoming cache line is being held in the LB 252 of the LE 250. In the system 200, for example, the LE 250 may forward a fetch request for the cache line to the upper level cache 230 via the fetch controller 260-2. The upper level cache 230 may then return the fetched cache line to the LE 250. Thus, the LE 250 can make the fetch request concurrently with the cache line coming into the LE 250. At this point, in certain embodiments described herein, the LE 250 can perform a concurrent fill and byte merge of the LB 252 for the target cache line. Note the concurrent fill and byte merge operation is described in greater detail herein with respect to FIG. 3.

Additionally, in the system 200 depicted in FIG. 2, there is a separation between the pipeline of the CRC 280 and the directory 218. On a writeback, the CRC 280 receives an indication of the command (cmd) (e.g., allocate, noalloc, touch) associated with the access request from the WB controller 290. If the command is a "touch," the CRC 280 updates and the writeback to upper level cache 230 is completed without accessing the directory 218. If the command is "dealloc," then the LB 252 is flushed to the upper level cache 230 if the cache line in the LB 252 is dirty; otherwise, the cache line is discarded. The state is invalidated from the directory 218 and CRC 280 (e.g., LRU). If the command is "allocate" and there is no eviction, then the CRC 280 may indicate the compartment to the LE 250 to allow the LE 250 to perform a writeback concurrent with the directory 218 and CRC update.

If there is an eviction, there may be two possibilities (i) the index/compartment is already held inside of another LE 250 (in particular, state engine 254) or (ii) the index/compartment is not being held. When the index/compartment is already held inside of another LE 250, the eviction is canceled, the target LE 250 clears its compartment and reallocates on the writeback. When the index/compartment is not being held by any other LE, then the LE 250 catches the old evicted state/tags from the directory 218, swaps data in the LB 252, and performs the eviction. In this instance, the LB 252 becomes an eviction buffer. Note the concurrent eviction operation is described in greater detail herein with respect to FIG. 4.

Figure 3:
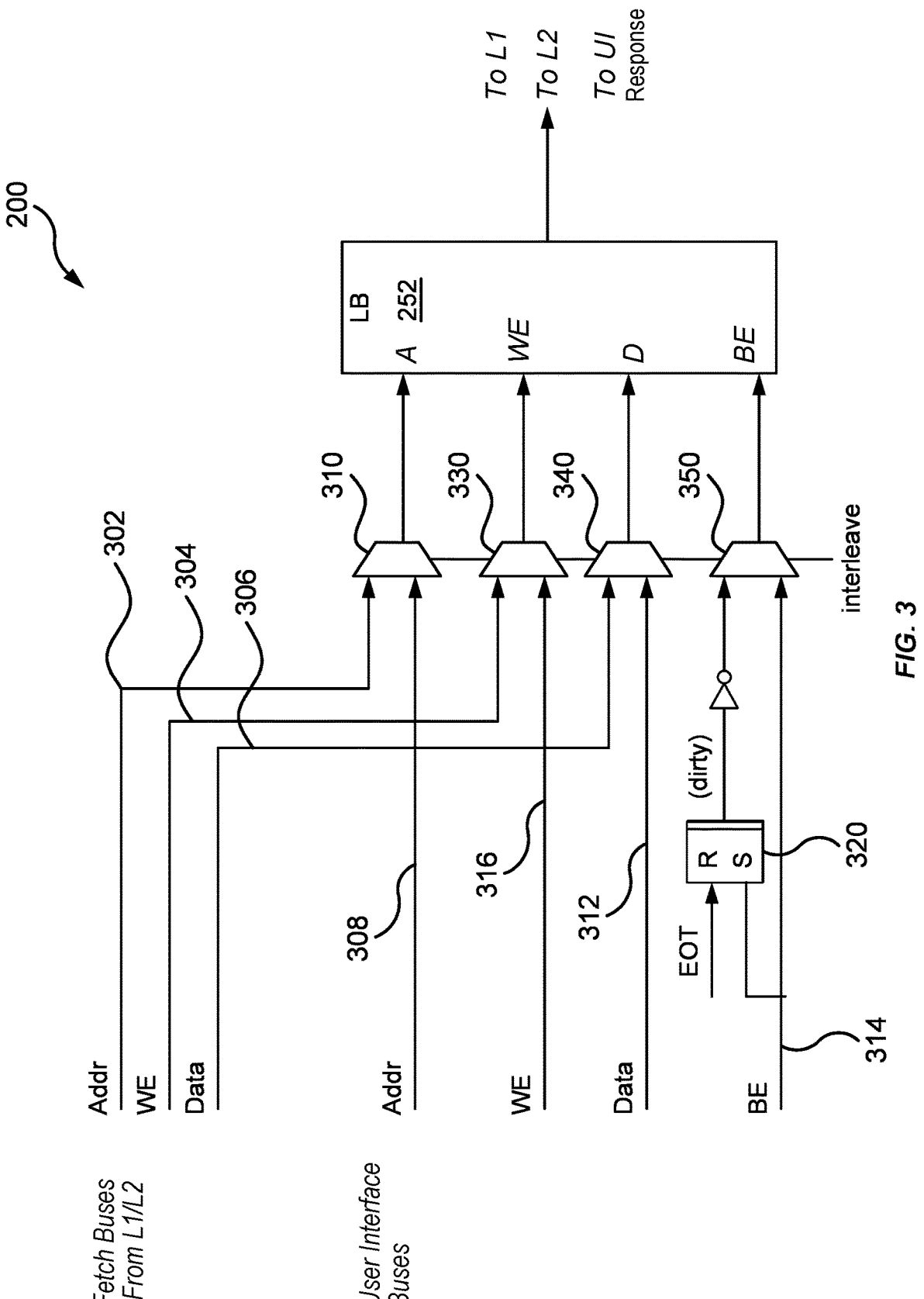
FIG. 3 illustrates an example scenario for performing a concurrent fill and byte merge operation, according to one embodiment.

FIG. 3 illustrates an example concurrent fill and byte merging operation that may be performed by the system 200 depicted in FIG. 2, according to one embodiment. As shown, one or more fetch buses from the lower level cache 240 and the upper level cache 230 may include an address bus 302, a write enable (WE) bus 304, and a data bus 306. Additionally, one or more user interface buses may include an address bus 308, a WE bus 316, a data bus 312, and a byte enable (BE) bus 314.

In certain embodiments, one or more multiplexers 310, 330, 340, and 350 may be used to select between inputs from the fetch busses and inputs from the user interface buses. For example, multiplexer 310 may receive a first input from address bus 302, receive a second input from address bus 308, and output one of the first/second inputs to an address input of the LB 252. Multiplexer 330 may receive a first input from WE bus 304, receive a second input from WE bus 316, and output one of the first/second inputs to a WE input of the LB 252. Multiplexer 340 may receive a first input from data bus 306, receive a second input from data bus 312, and output one of the first/second inputs to a data input of the LB 252.

In certain embodiments, one or more of the inputs of multiplexer 350 may be controlled via the BE signals from the UI 210. The output of the multiplexer 350 may be coupled to a BE input of the LB 252. The BE signals indicated via the BE bus 314 may be used to write specific "dirty" bytes into the LB 252. For example, the BE signals may be latched and used to block the write for the fill data when it is fetched from the upper level cache 230. The latch 320 may be cleared at end of transfer (EOT). In certain embodiments, once the byte merging is done, the LB 252 may write the "dirty" parts of the line to the upper level cache 230 after the UI acknowledgement of the store is completed (e.g., via UI response 216).

Figure 4:
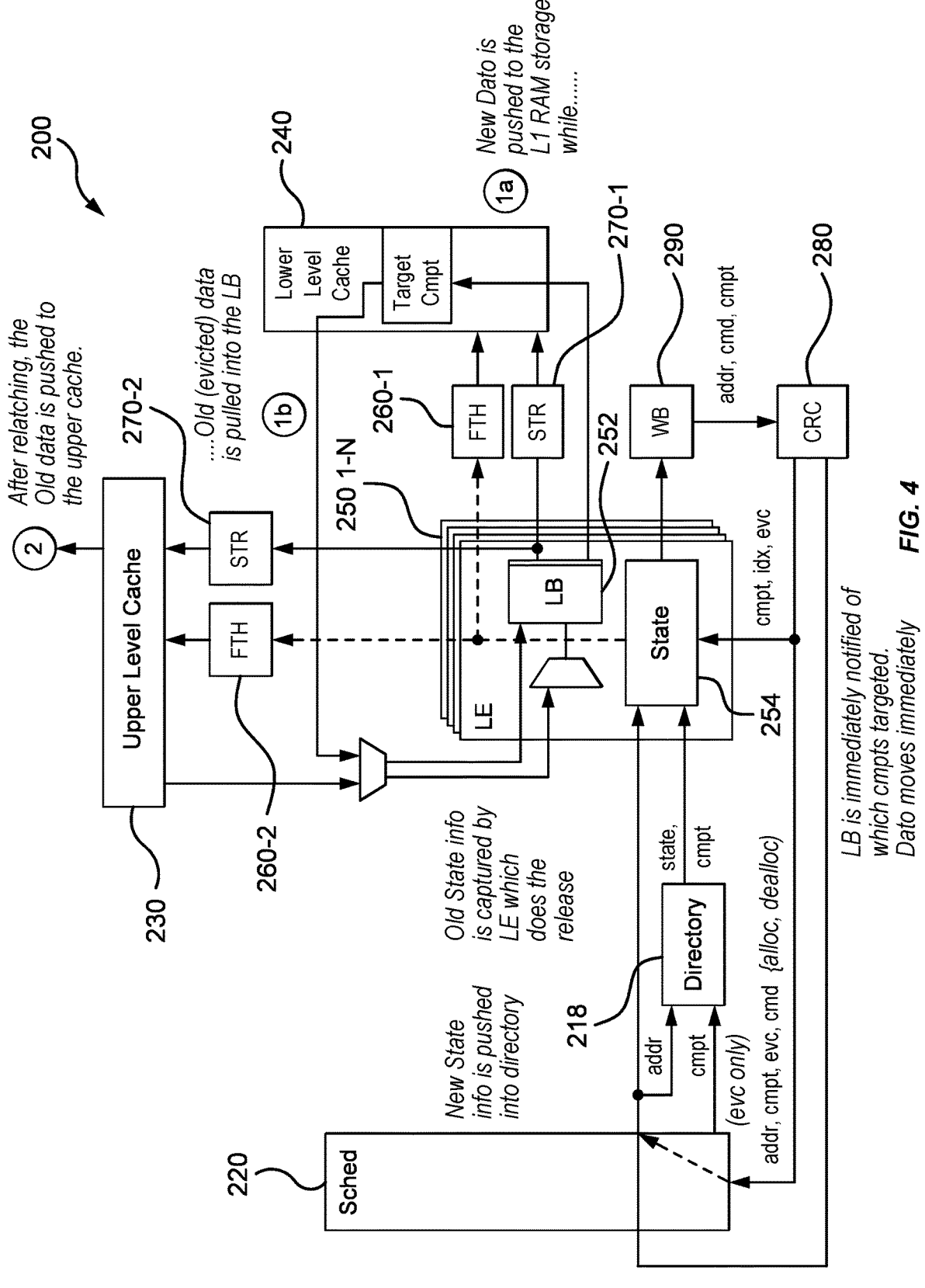
FIG. 4 illustrates an example scenario for performing a concurrent eviction operation, according to one embodiment.

FIG. 4 illustrates an example concurrent eviction operation that may be performed by the system 200 depicted in FIG. 2, according to one embodiment. As shown in FIG. 4, if an eviction occurs and the index/compartment is not held within another LE 250, then the CRC 280 may notify the allocating LB 252 of which compartment within the lower level cache 240 is targeted. Additionally, the CRC 280 may push new state information into the directory 218 and the LE 250 may capture the old state information and perform the release to an upper level cache. As part of the concurrent eviction, the LB 252 may push the new data into the target compartment within the lower level cache 240 (e.g., L1 cache) (step 1a) while old (evicted) data from the target compartment is concurrently pulled into the allocating LB 252 (step 1b). After relatching, the old data within the LB 252 may then be pushed to the upper level cache 230 (step 2).

Figure 5:
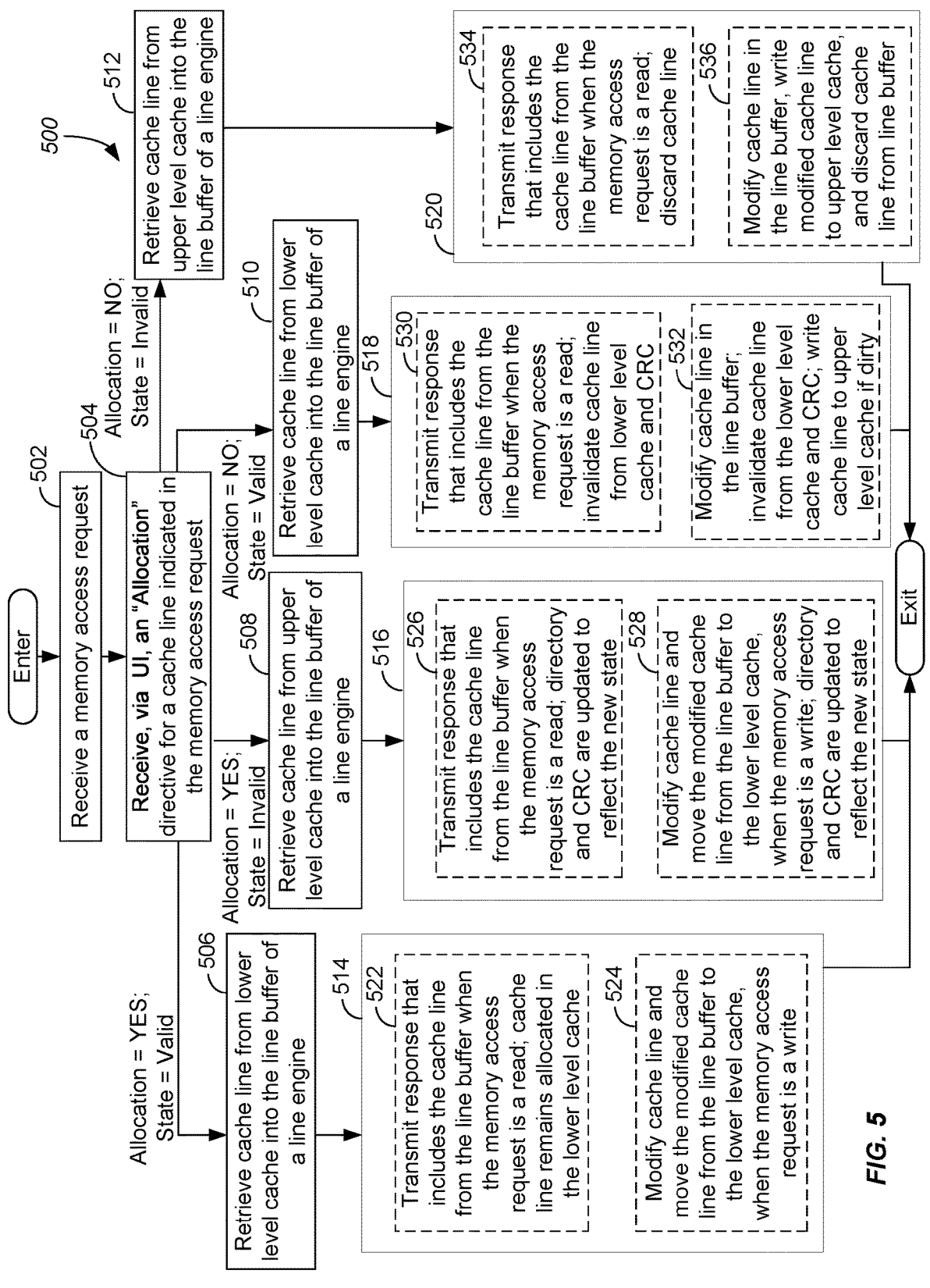
FIG. 5 is a flowchart of an example method for controlling allocation of a cache line when performing a memory access request, according to one embodiment.

FIG. 5 is a flowchart of a method 500 for controlling allocation of a cache line when performing a memory access request. Method 500 may be performed by software (e.g., line engine code 165).

Method 500 may enter at block 502, where the line engine code receives a memory access request from a user interface (e.g., UI 210). The memory access request may be a write request or a read request. At block 504, the line engine code receives, via the UI, an "Allocation" directive for a cache line associated with the memory access request. For example, the "Allocation" directive may be set to "YES" when the user wants the cache line associated with the memory access request to be allocated into a lower level cache (e.g., lower level cache 240). In another example, the "Allocation" directive may be set to "NO" when the user does not want the cache line associated with the memory access request to be allocated into the lower level cache. In some embodiments, the "Allocation" directive is included as part of the memory access request received in block 502.

If Allocation=YES and the state of the cache line (determined via the directory 218) is valid, then the method 500 proceeds to block 506. At block 506, the cache line is retrieved from the lower level cache into a LB (e.g., LB 252) of a LE (e.g., LE 250). At block 514, the line engine code may perform sub-block 522 or sub-block 524, based on the type of memory access request. For example, at sub-block 522, the line engine code transmits a response that includes the cache line from the LB when the memory access request is a read request. Here, the cache line remains allocated in the lower level cache. On the other hand, at sub-block 524, the line engine code modifies the cache line and moves the modified cache line from the LB to the lower level cache when the memory access request is a write request.

If Allocation=YES and the state of the cache line (determined via the directory 218) is invalid, then the method 500 proceeds to block 508. At block 508, the cache line is retrieved from an upper level cache (e.g., upper level cache 230) into the LB of a LE. At block 516, the line engine code may perform sub-block 526 or sub-block 528, based on the type of memory access request. For example, at sub-block 526, the line engine code transmits a response that includes the cache line from the LB when the memory access request is a read request. On the other hand, at sub-block 528, the line engine code modifies the cache line and moves the modified cache line to the lower level cache, when the memory access request is a write. In either case, the directory 218 and CRC 280 (e.g., LRU) are updated to reflect the new state and the data is written into the lower level cache 240.

If Allocation=NO and the state of the cache line (determined via the directory 218) is valid, then the method 500 proceeds to block 510, where the cache line is retrieved from the lower level cache into the LB of a LE. At block 518, the line engine code may perform sub-block 530 or sub-block 532, based on the type of memory access request. For example, at sub-block 530, the line engine code transmits a response that includes the cache line from the LB when the memory access request is a read request. The cache line is then invalidated from the lower level cache 240 and CRC 280. On the other hand, at sub-block 532, the line engine code modifies the cache line in the LB when the memory access request is a write request. Similarly, the cache line is invalidated from the lower level cache 240 and CRC 280 and written back to the upper cache via store controller 270-2 if dirty.

If Allocation=NO and the state of the cache line (determined via the directory 218) is invalid, then the method 500 proceeds to block 512. At block 512, the cache line is retrieved from the upper level cache into the LB of a LE. At block 520, the line engine code may perform sub-block 534 or sub-block 536, based on the type of memory access request. For example, at sub-block 534, the line engine code transmits a response that includes the cache line from the LB when the memory access request is a read request. The cache line is then discarded. At sub-block 536, the line engine code modifies the cache line in the LB, writes the modified cache line to the upper level cache, and discards the cache line from the LB.

FIG. 6 is a flowchart of a method 600 for performing a concurrent fill and byte merge operation of a cache line within a LB (e.g., LB 252), according to one embodiment. The method 600 may be performed by software (e.g., line engine code 165).

Method 600 may enter at block 602, where the line engine code receives a memory access request from a user interface (e.g., UI 210). The memory access request includes an indication of whether a cache line associated with the memory access request is to be allocated into a lower level cache (e.g., lower level cache 240).

At block 604, the line engine code determines that the memory access request has encountered a cache miss within a cache directory. At block 606, the line engine code transmits a fetch request to an upper level cache (e.g., upper level cache 230) for the cache line. At block 608, the line engine code concurrently writes and merges dirty portions of the cache line, based on the memory access request, with fill data obtained from the upper level cache into a LB (e.g., LB 252) of a LE (e.g., LE 250). At block 610, the line engine code writes the dirty portions of the cache line into the upper level cache.

FIG. 7 is a flowchart of a method 700 for performing a concurrent eviction operation of a cache line within a LB (e.g., LB 252), according to one embodiment. The method 700 may be performed by software (e.g., line engine code 165).

Method 700 may enter at block 702, where the line engine code receives a memory access request from a user interface (e.g., UI 210). The memory access request includes an indication of whether a cache line associated with the memory access request is to be allocated into a lower level cache (e.g., lower level cache 240).

At block 704, the line engine code writes the cache line into a LB (e.g., LB 252) within a LE (e.g., LE 250). At block 706, the line engine code determines whether there has been an eviction. If so, then the line engine pushes the cache line from the LB into the lower level cache while pulling the evicted cache line from the lower level cache into the LB (block 708). At block 710, the line engine code pushes the evicted cache line into the upper level cache.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
 receiving, at runtime via an external user interface, a user-initiated memory access request, wherein the user-initiated memory access request comprises an indication of whether a cache line associated with the user-initiated memory access request is to be allocated into a lower level cache within a computing system;
 writing the cache line into a line buffer within a line engine in the computing system in response to receiving the user-initiated memory access request; and
 moving the cache line from the line buffer within the line engine to an upper level cache in the computing system via a data path that excludes the lower level cache, in response to the user-initiated memory access request indicating the cache line is not to be allocated into the lower level cache, wherein the line engine is external to the lower level cache and the upper level cache in the computing system.

2. The computer-implemented method of claim 1, further comprising moving the cache line from the line buffer to the lower level cache in response to the user-initiated memory access request indicating the cache line is to be allocated into the lower level cache.

3. The computer-implemented method of claim 1, wherein the computing system comprises a plurality of line engines, each comprising a respective line buffer.

4. The computer-implemented method of claim 1, wherein the lower level cache is a Level 1 (L1) cache.

5. The computer-implemented method of claim 1, wherein the upper level cache is a Level 2 (L2) cache or a Level 3 (L3) cache.

6. The computer-implemented method of claim 1, wherein the cache line is moved to the upper level cache without modifying a state of a directory of the lower level cache.

7. The computer-implemented method of claim 6, wherein the directory and a cache replacement protocol for the computing system are implemented separately.

8. A system comprising:
 a plurality of line engines, each line engine of the plurality of line engines comprising a respective line buffer;
 a lower level cache external to the plurality of line engines; and
 an upper level cache external to the plurality of line engines, wherein at least a first line engine of the plurality of line engines comprises logic configured to perform an operation comprising:
  receiving, at runtime via an external user interface, a user-initiated memory access request, wherein the user-initiated memory access request comprises an indication of whether a cache line associated with the user-initiated memory access request is to be allocated into the lower level cache;

writing the cache line into the line buffer within the first line engine in response to receiving the user-initiated memory access request; and moving the cache line from the line buffer within the first line engine to the upper level cache via a data path that excludes the lower level cache, in response to the user-initiated memory access request indicating the cache line is not to be allocated into the lower level cache.

9. The system of claim 8, wherein the operation further comprises moving the cache line from the line buffer to the lower level cache in response to the user-initiated memory access request indicating the cache line is to be allocated into the lower level cache.

10. The system of claim 8, wherein the lower level cache is a Level 1 (L1) cache.

11. The system of claim 8, wherein the upper level cache is a Level 2 (L2) cache or a Level 3 (L3) cache.

12. The system of claim 8, wherein the cache line is moved to the upper level cache without modifying a state of a directory of the lower level cache.

13. The system of claim 12, further comprising a cache replacement protocol for replacing data within the lower level cache, wherein the directory and the cache replacement protocol are implemented separately.

14. A computer-readable storage medium having computer-readable program code embodied therewith, the computer-readable program code executable by one or more computer processors to perform an operation comprising:

receiving, at runtime via an external user interface, a user-initiated memory access request, wherein the user-initiated memory access request comprises an indication of whether a cache line associated with the user-initiated memory access request is to be allocated into a lower level cache within a computing system;

writing the cache line into a line buffer within a line engine in the computing system in response to receiving the user-initiated memory access request; and moving the cache line from the line buffer within the line engine to an upper level cache in the computing system via a data path that excludes the lower level cache, in response to the user-initiated memory access request indicating the cache line is not to be allocated into the lower level cache, wherein the line engine is external to the lower level cache and the upper level cache in the computing system.

15. The computer-readable storage medium of claim 14, the operation further comprising moving the cache line from the line buffer to the lower level cache in response to the user-initiated memory access request indicating the cache line is to be allocated into the lower level cache.

16. The computer-readable storage medium of claim 14, wherein the computing system comprises a plurality of line engines, each comprising a respective line buffer.

17. The computer-readable storage medium of claim 14, wherein the lower level cache is a Level 1 (L1) cache.

18. The computer-readable storage medium of claim 14, wherein the upper level cache is a Level 2 (L2) cache or a Level 3 (L3) cache.

19. The computer-readable storage medium of claim 14, wherein the cache line is moved to the upper level cache without modifying a state of a directory of the lower level cache.

20. The computer-readable storage medium of claim 19, wherein the directory and a cache replacement protocol for the computing system are implemented separately.

* * * * *